United States Patent [19]

Coville

[11] 4,132,844

[45] Jan. 2, 1979

[54] TREATMENT OF ACRYLAMIDE POLYMER GEL

[75] Inventor: Michael W. C. Coville, Bingley, England

[73] Assignee: American Cyanamid Company, Stamford, Conn.

[21] Appl. No.: 799,895

[22] Filed: May 23, 1977

[51] Int. Cl.² .............................................. C08F 6/10
[52] U.S. Cl. .................................... 528/499; 528/503
[58] Field of Search ................ 528/499, 503; 526/303; 260/29.6 Z

[56] References Cited

U.S. PATENT DOCUMENTS

| | | | |
|---|---|---|---|
| 2,960,486 | 11/1960 | Pye | 526/23 |
| 3,634,944 | 1/1972 | Zonis | 34/12 |
| 3,714,136 | 1/1973 | Gershberg | 260/29.6 Z |
| 3,753,962 | 8/1973 | Restaino | 526/303 |
| 3,755,280 | 8/1973 | Saunders | 528/487 |
| 3,905,122 | 9/1975 | Ohshima | 34/12 |
| 4,032,701 | 6/1977 | Hughes | 526/303 |

*Primary Examiner*—Paul R. Michl
*Attorney, Agent, or Firm*—Frank M. Van Riet; Bruce F. Jacobs

[57] ABSTRACT

A method for reducing the amount of water-insolubles and free monomer in an aqueous acrylamide polymer gel whereby the gel is heated at from about 80° C to about 150° C for at least about 30 minutes while the water content of the gel is maintained substantially constant.

8 Claims, No Drawings

TREATMENT OF ACRYLAMIDE POLYMER GEL

BACKGROUND OF THE INVENTION

High molecular weight polymers of acrylamide have found use over the years as flocculants for settling industrial slurries and removing suspended matter from municipal or process water. To be as effective as possible, these polymers should be water-soluble and have a high molecular weight.

One major problem which has been plaguing the industry for many years is the difficulty with which recovery of these high molecular weight polymers in a dry state is achieved. They are normally prepared as very viscous, aqueous gels which must be dried before transportation of the polymers is economical. Drying, however, usually tends to deleteriously alter the properties of the polymers to the extent that water-insolubles form therein and the molecular weight tends to decrease. The reduction in molecular weight is particularly bothersome because the effectiveness of these polymers depends proportionally upon the molecular weight thereof.

U.S. Pat. No. 3,714,136 describes one method of drying and recovering these polymers wherein the gels are cut into fragments and dried while suspended in a gas stream at 20° C. to 100° C. for 5-60 minutes. The gel may be dusted with sodium sulfate or frozen prior to cutting.

While the polymers produced according to this prior art process are excellent overall, they tend to exhibit a loss in viscosity, and consequently molecular weight, after treatment and, as mentioned above, since it is advantageous to achieve the highest molecular weight possible, there exists an opportunity to improve on said process or develop another, wherein drying would not result in a reduction of molecular weight.

SUMMARY

It has now been discovered that polymers of acrylamide can be recovered from aqueous gels thereof utilizing a method which not only substantially reduces the amount of insolubles and free monomer in the recovered polymer but results in a polymer having a molecular weight higher than that of the gel.

The process resides primarily in the heating of the polymer gel after production thereof and before drying while maintaining the water content thereof substantially constant.

DESCRIPTION OF THE INVENTION INCLUDING PREFERRED EMBODIMENTS

As mentioned above, the instant process comprising heating an acrylamide polymer gel under such conditions that the free monomer content is reduced and the viscosity is increased while the production of water-insoluble material is substantially prevented.

At the present time acrylamide polymers are prepared by polymerizing acrylamide alone or in combination with weight soluble monomers copolymerizable therewith in an aqueous medium by the action of a suitable polymerization catalyst such as a reddox system, a free radial system or the like. The polymerization product usually contains residual acrylamide monomer due to the fact that the polymerization does not usually reach 100% completion. The process of monomeric acrylamide is advantageous because a maximum of about 0.05% has been set when the polymer is to be used for the clarification of drinking water and acrylamide polymers which contain more than about 0.5% of monomeric acrylamide are generally classified as poison. When acrylamide polymers are to be utilized in the manufacture of paper, the monomeric acrylamide limit is about 0.2%.

As manufactured, acrylamide polymer hydrous gels normally contain from about 50% to about 95% water, by weight. Economics require that the water be removed before the gel is shipped and therefore it is preferred that the polymer be supplied in dry, particulate free flowing form. This is usually accomplished commercially by extruding the gel into cords or strands (see U.S. Pat. Nos. 3,634,944 and 3,905,122) which usually are about one-eighth inch to one-fourth inch in diameter and subjecting the strands to a high temperature to render their exterior nonadhesive and then to a lower temperature for a time sufficient to permit drying without formation of cross-linkages which normally produce insoluble material.

The prior art procedures however do not generally decrease the monomer content of the polymer although the art has shown that the acrylamide content may be reduced to a non-toxic level by dissolving in the gel a material such as sodium meta bisulfite and subjecting the resultant material to heating, see U.S. Pat. Nos. 2,960,486 and 3,755,280. These procedures have proven unsatisfactory do to the fact that the sulfites are relatively expensive and the incorporation of the sulfite in the gel also adds to said expense.

The polymer gels which are treated according to the novel process of the instant invention are preferably at least about 75% water and have a molecular weight of at least about 4 million and preferably at least about 12 million. They are produced from acrylamide monomer, alone or in combination with up to about 50%, by weight, of other monomers copolymerizable therewith such as acrylic acid, methacrylic acid, sodium acrylate, sodium methacrylate, itaconic acid, dimethylaminoethyl methacrylate (either quaternized or neutralized), diethylaminoethyl acrylate (quaternized or neutralized), and the like, the gels containing the copolymers of said monomers in substantially the identical concentrations.

According to the instant process, the acrylamide polymer gel, having been produced by any well-known polymerization procedure such as suspension, emulsion, precipitation procedures etc. are treated by subjecting them to a temperature ranging from about 80° C. to about 150° C., preferably from about 100° C. to about 130° C., for at least about 30 minutes, preferably for at least about 90 minutes. It has generally been found that the higher the temperature of the heat treatment, the shorter the contact time so that at about 150° C. a contact time of about 30 minutes would be sufficient while at 80° C. a contact time of about 4 hours would generally be used.

The heating step must be conducted under such conditions that substantially no drying whatsoever of the polymer gel occurs. If any substantial amount of drying is effected, it has been found that the undesirable production of large amounts of insoluble material results. Therefore, it is necessary to simultaneously maintain the water content of the gel undergoing heating at substantially the same concentration as that of the gel being charged. Any effective means of maintaining the water concentration of the gel substantially uniform may be used. Satisfactory procedures which have proven useful include placing the gel in a saturated steam atmosphere such as by sealing the gel in a water impermeable plastic material and placing it in water or sealing the gel in a water impermeable plastic material and placing it in a circulating air oven or placing the gel in an air impermeable atmosphere such as a non-circulating air oven to which has been added a highly humid atmosphere. As can be seen, many different techniques may be utilized to accomplish this desired result, the examples above constituting the most economical techniques. Other techniques could also be employed without departing from the scope of the present invention, the crux of the process residing in the simultaneous maintenance of the polymer gel water contained at a substantially constant level and the heating of said gel under the conditions specified above.

The gel can be charged to the heating and water concentration maintenance step of the process directly from the polymerization vessel or it may be first granulated, extruded into cords or strings, chopped into pieces etc. or otherwise form into sections of a greater service area before the heat treatment. When the polymerization is initiated by a catalyst or other known initiator, it is preferred that an extraneous amount of catalyst be added to the monomer charge over and above that amount which normally be required for the polymerization of acrylamide, with or without its co-monomer, in order to assure that the gel itself will contain some catalyst. It has been found that the presence of a small amount of polymerization catalyst in the gel per se improves the process with regard to the reduction of the residual monomer content and the resultant viscosity increase. It should be recognized, however, that the advantageous results of the instant process can be achieved in the absence of such an extraneous amount of catalyst.

After the gel has been heated as described above, it is dried according to any known procedure such as set forth in the above-acknowledged patents. If the gel has not been previously granulated or otherwise formed into small particles, it is preferred that the gel resulting from the heat treatment be granulated before the drying thereof is accomplished. Granulation of the gel to a particle size of about 100% minus 4, 100% plus 10 mesh be produced, i.e. all the particles pass through a screen having about 4 meshes to the inch but are retained on a screen having about 10 meshes to the inch.

The following examples are set forth by way of illustration only and are not to be construed as limitations on the present invention except as set forth in the appended claims. All parts and percentages are by weight unless otherwise specified.

In the following examples the material produced is tested for its properties according to the procedures set forth hereinbelow.

STANDARD VISCOSITY

A. SOLUTION PREPARATION 0.3 parts of the sample is weighed out on a tared weighing dish utilizing an analytical balance. 300 mls. of distilled water are measured into a graduated cylinder and transferred to a 600 ml. tall form beaker on a magnetic stirrer. Utilizing the stirrer, the water is maintained under vigorous agitation and the sample is slowly added thereto such that the polymer particles drop into the side of the vortex the rate of addition is controlled so as to avoid the formation of polymer clots. If a polymer clot forms, the sample is discarded and a new one prepared. After the addition of the polymer is complete, the solution is stirred for 2 hours at such a speed as to maintain half a vortex and the solution is then filtered through a pre-weighed water washed, 100 mesh stainless steel gauze which is retained for examination of insolubles. To the filtrate are added 17.53 parts of sodium chloride with stirring such that half a vortex is not exceeded for an additional 5 minutes.

B. MEASUREMENT OF VISCOSITY

Viscosity is determined by means of a Brookfield viscometer Model LVT, with a U.L. adaptor and at a spindle speed of 60 r.p.m. The temperature of the polymer solution is adjusted to 25° C. plus or minus 0.2 and 25 mls. of solution are placed in the tube which is then attached to the viscometer. The clutch is held in the down position so that the middle is damped. The motor is turned on and after several seconds the clutch is released and the scale is allowed to rotate for 30 seconds. The clutch is then held down and the motor turned off so that the scale marker may be read. Three readings are obtained and the viscosity is taken as the average of these three readings.

INSOLUBLES

(A) B.T.I. TEST

The 100 mesh stainless steel gauze used to filter the solution for viscosity determination is washed as follows: 100 mls. of water are placed in a beaker which contains the unfiltered solution, swilled around, and then washed through the gauze. The latter is washed with a further 200 mls. of water and then dried to a constant weight in an oven at 110° C. The percent insolubles is determined by subtracting the initial weight from the final weight and multiplying the difference by 30.

(B) NEFF INSOLUBLES TEST

This test is not utilized unless the insolubles are very high, in which case it is regarded as more accurate than the above test. This procedure is as follows: 500 mls. of water are placed in a one liter beaker and stirred at high speed with a 2 inch square paddle stirrer. 1.25 parts of polymer are added, the mixture is stirred for 2 minutes at high speed to disperse the polymer and then the speed is reduced to 400 r.p.m. and kept at this rate for 1 hour 55 minutes. After this time, 1.25 grams of sodium chloride are added and the resultant solution is stirred for 5 minutes after which it is filtered through a pre-weighed and water-washed 100 mesh stainless steel gauze. The gauze is washed with 500 mls. of water and dried to a constant weight in an oven at 110° C. The percent insolubles is determined by subtracting the initial weight from the final weight, multiplying the difference by 100 and dividing the product by 1.25.

FREE MONOMER DETERMINATION

(A) EXTRACTION OF FREE MONOMER

Into a 16 ounce polyethylene bottle are weighed out 10 parts of polymer to which are added 100 mls. of 80% aqueous methanol. The bottle is sealed and shaken thoroughly to disperse the polymer and allowed to roll 16 hours on a laboratory tumbler. The polymer is then allowed to settle and aliquots are removed for analysis as required.

Samples which are removed from the drier, granulator or the gel itself are treated somewhat differently, the respective procedures being as follows (1) DRIED SAMPLES 10 parts of polymer are weighed out and added to 100 mls. of 80% aqueous methanol and slurried using a Silverson laboratory mixer-emulsifier L2R until no large pieces of gel remain. The system is then transferred to a polyethylene bottle and treated as above.

(2) GRANULATED SAMPLES 25 grams of gel are weighed out, added to 175 mls. of 85% aqueous methanol and slurried using the L2R machine. When the gel has been cut sufficiently fine, the whole solution is transferred to a 16 ounce polyethylene bottle. The total weight of the liquid plus the polymer is made up to 225.6 parts with 80% methanol and the bottle is sealed and rolled as above.

(3) GEL SAMPLES

The procedure for the gel samples is identical to that of the granulated samples above except that the 25 part sample used for the extraction is cut as a thin cross section of the material coming off the belt.

(B) ANALYSIS OF FREE MONOMER

The free monomer analysis is carried out on a Hewlett-Packard 5750G chromatograph under the following conditions:

| | |
|---|---|
| Temperature: | 175° C |
| Nitrogen flow: | 100 mls/min. |
| Hydrogen flow: | 35 mls/min. |
| Air flow: | 300 mls/min. |
| Attenuation: | $4 \times 10^2$ |
| Column: | 5 feet ¼ inch o.d. glass, packed with 15% PEG 20M on 80–10 mesh Universal support |
| Sample Size: | 2.5μl |
| Standards: | 0.004%, 0.008%, 0.012%, 0.016% and 0.02%–80% aqueous methanol (weight/volume) |

The standards are injected on-column (duplicate injections) and the areas of the acrylamide peaks which occur as shoulders on the tail of the methanol peaks are read. A plot of peak area against acrylamide concentration should give a straight line. The concentration of free monomer in the sample is then obtained from the area of its acrylamide peak and the calibration line. For comminuted and dried samples, this result is multiplied by 10 to achieve the free monomer percent present in the solid polymer. For gel and granulated samples, the result is multiplied by 25 to achieve the amount of free monomer present in the solid polymer in the gel (granulated and gel samples should give closely similar results as should dried and comminuted samples. Should this not be the case, the higher free monomer figure is taken as correct).

EXAMPLE 1

To a suitable reaction vessel equipped with stirrer, are charged 73 parts of water and 27 parts of acrylamide with stirring at a steady rate. Stirring is continued for about 30 minutes to insure complete dissolution and the pH is then adjusted to 7.0 by adding either 50% caustic soda solution or glacial acetic acid. To this solution is then added 500 parts per million of azobisisobutronitrile dispersed in methanol and nitrogen flow is initiated into the vessel. Seven parts per million of ammonium persulfate and 2.0 parts per million of ammonium ferrous sulfate. The resultant material is charged to the open end of a continuous, moving, 12 inch wide belt at a temperature of 1.5° C. in an oxygen-free atmosphere. Polymerization of the monomer solution is substantially complete in about 92 minutes. The resultant acrylamide polymer gel is cut into a plurality of equally sized pieces each of which is placed in a water-impermeable polyethylene bag. Each bag is placed in a water bath at a temperature of 100° C. The bags are then allowed to remain in the bath for from 0.5 hours to 3.0 hours. The bags are then removed and the resultant polymer is analyzed. The results are set forth in Table I, below.

TABLE 1

| Sample | Hours | Viscosity (cps) | BTI Insols % | Free Monomer % |
|---|---|---|---|---|
| 1 | 0.5 | 4.39 | 5.4 | 0.05 |
| 2 | 1.0 | 4.46 | 0.2 | 0.05 |
| 3 | 1.5 | 4.76 | 0.4 | 0.07 |
| 4 | 2.0 | 4.8 | 0.4 | 0.05 |
| 5 | 2.5 | 4.67 | 0.6 | 0.05 |
| 6 | 3.0 | 4.70 | 0.0 | 0.04 |
| Control | 0 | WNF | WNF | 0.07 |

WNF = would not filter

EXAMPLE 2

The procedure of Example 1 is again followed except that 12.0 parts of sodium acrylate, 18 parts of acrylamide and 70 parts of water are used. The reaction media is charged to the belt at 5° C. The residence time of the media on the belt effecting substantially complete polymerization is 2 hours. The results of the run are set forth in Table II, below.

TABLE II

| Sample | Hours | Viscosity (cps) | Neff Insols. % | Free Monomer % |
|---|---|---|---|---|
| 1 | 1 | 5.59 | 1.8 | 0.048 |
| 2 | 2 | 5.59 | 1.3 | 0.033 |
| 3 | 3 | 5.71 | 1.3 | 0.028 |
| Control | 0 | 4.51 | WNF | 0.14 |

EXAMPLE 3

The procedure of Example 2 is again followed except that the sodium acrylate is replaced by an equivalent amount of dimethylaminoethyl methacrylate quaternized with dimethyl sulfate. Substantially equivalent results are obtained.

EXAMPLE 4

The procedure of Example 2 is again followed except that the sodium acrylate is replaced by an equivalent amount of diethylaminoethyl acrylate. The insolubles reduction, free monomer reduction and viscosity increase is similar to the results shown in Table II.

I claim:

1. A method for the reduction of the amount of water insolubles and free monomer in an aqueous acrylamide polymer gel charge containing at least about 25% polymer and having a molecular weight of at least about 4 million which comprises heating said polymer gel, in the substantial absence of a sulfite compound, at a temperature ranging from about 80° C. to about 150° C. for at least about 30 minutes while simultaneously maintaining the water content of the gel undergoing heating at substantially the concentration of that of said charge and recovering the resultant polymer gel.

2. A method according to claim 1 wherein the recovered polymer gel is dried.

3. A method according to claim 1 wherein the recovered polymer gel is granulated and dried.

4. A method according to claim 1 wherein said gel charge contains an active polymerization catalyst.

5. A method according to claim 1 wherein said polymer is polyacrylamide.

6. A method according to claim 1 wherein said polymer is a copolymer of acrylamide and sodium acrylate.

7. A method according to claim 1 wherein said polymer is a copolymer of acrylamide and dimethylaminoethyl methacrylate.

8. A method according to claim 1 wherein said polymer is a copolymer of acrylamide and diethylaminoethyl acrylate.

* * * * *